United States Patent Office 3,407,055
Patented Oct. 22, 1968

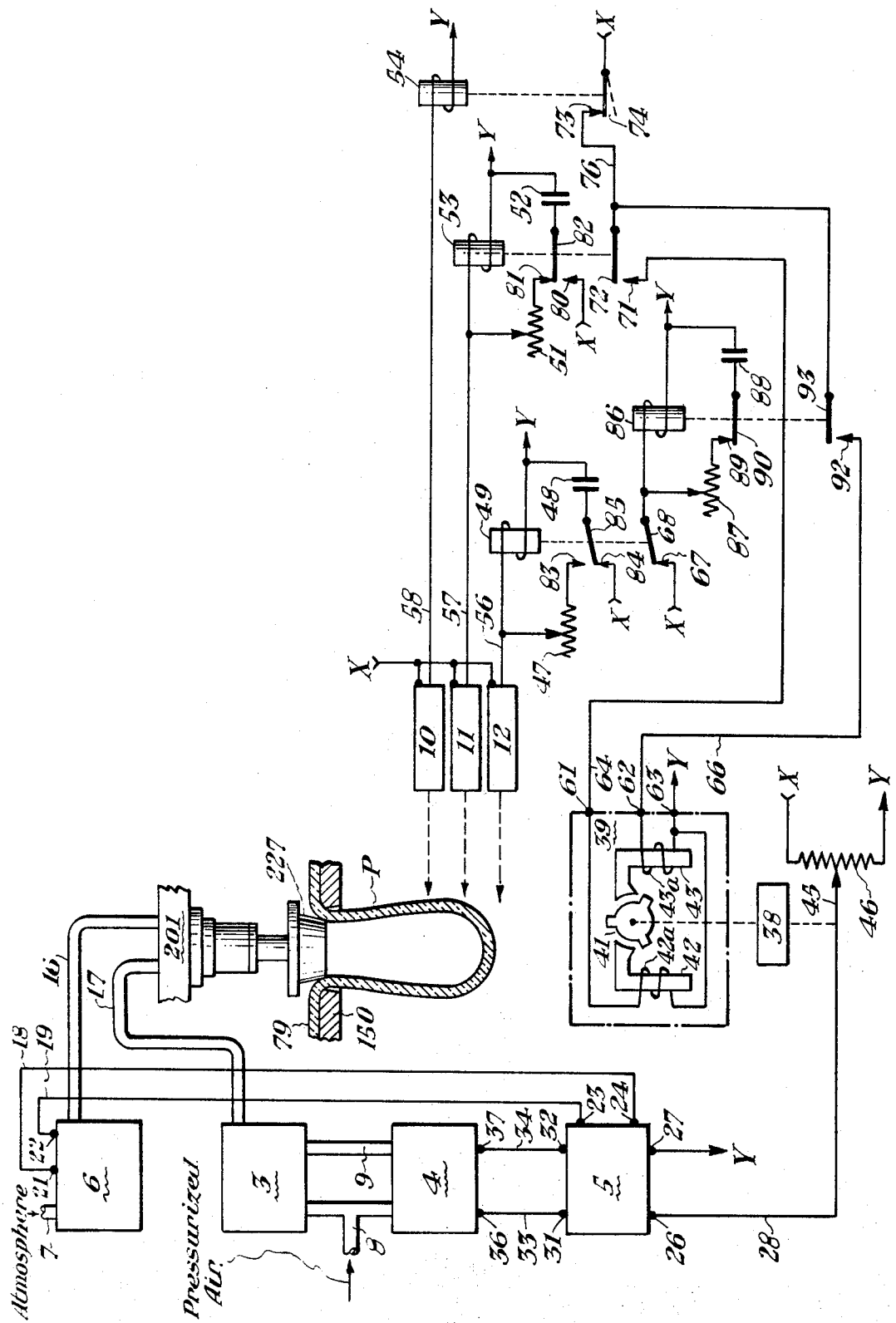

3,407,055
AUTOMATIC CONTROL MEANS
Leroy C. Argyle, Elmira, and Arthur T. Bublitz, Corning, N.Y., assignors to Corning Glass Works, Corning, N.Y., a corporation of New York
Filed May 7, 1965, Ser. No. 453,911
9 Claims. (Cl. 65—161)

ABSTRACT OF THE DISCLOSURE

Apparatus or means for continuously automatically detecting and controlling the length of a succession of pendent parisons or blanks blow-formed from a molten thermoplastic material, such apparatus including a detector comprising at least three vertically stacked radiant energy responsive devices for detecting the length of said blanks and means for adjusting the pressure of puff air used for blow-forming said blanks in accordance with deviations from a desired range of length for the blanks detected by said detector.

---

The present invention relates to an automatic control means, and more specifically to a means for continuously automatically controlling the length of parisons or blanks to be used in the manufacture of blown or molded articles of a thermoplastic material. Still more specifically, the invention relates to a means for automatically and continuously controlling the length of parisons or blanks of a thermoplastic material and which are preformed by the blowing thereof in an unconfined space and are thereafter enclosed in a mold to be further blown or otherwise formed into hollow vessels or articles such as, for example, enclosures or envelopes for incandescent electric lamps.

There is shown and described, for example, in Letters Patent of the United States 1,790,397, issued Jan. 27, 1931 to William J. Woods and David E. Gray and entitled Glass-Working Machine, apparatus for and a method of forming, from a continuous ribbon of molten or plastic glass, a succession of blown glass articles. Such ribbon is initially formed into a succession of parisons or blanks by so-called puff air supplied against areas on the top surface of the ribbon by a moving succession of blowheads while such ribbon is being carried along by a moving conveyor upon which the bottom surface of the ribbon rests and which is provided with a succession of orifices each of which cooperates with a different one of said blowheads for the forming of each of said parisons or blanks. Following the forming of said parisons or blanks they are each enclosed in one of a moving succession of molds and, during the further travel of the conveyor, are blown in such molds into glass articles conforming to the shape of the mold cavities. This limited description of the operation of the apparatus of said patent is sufficient for the purposes of the present invention and reference is made to said patent if details of the practice of the invention therein disclosed are desired.

In practicing the invention disclosed in said patent, it is, of course, desirable that each of the finished articles formed during any period of operation of the apparatus be similar, within tolerable variational limits, to each of the other articles formed during such period. For example, it is desirable that the weight and wall thickness distribution throughout each finished article be as identical as possible to that of each of the other of such articles. It has been found that one of the factors which has considerable effect on variations beyond tolerable limits in the finished articles is variations in the length of the parisons or blanks from which the finished articles are subsequently formed or blown. It is accordingly, one object of the present invention to provide a control means which will maintain, to the extent practicable, uniformity in length of a succession of blanks or parisons which are subsequently successively blown or molded into a plurality of finished articles.

It is another object of the present invention to provide a novel detection means for sensing when part of a succession of blow-formed and gravity formed bodies vary in length beyond preselected tolerable limits for variations in length thereof.

It is another object of the present invention to detect critical deviations in the length of a succession of blown and suspended bodies of a thermoplastic material, and to automatically make adjustments in the pressure used to blow such bodies and thereby bring the remainder of the succession back within tolerable variational limits for said length.

It is a fourth object of the invention to provide a means for controlling the pressure used to blow-form a succession of glass parisons so that each such parison, when introduced to a mold for final forming thereof, will be substantially the same length as the others of such succession.

In accomplishing the above objects of the invention, there is provided a first control loop which automatically regulates or adjusts, in accordance with a preselected value or preset therefor, the so-called puff-air pressure used to form the above-discussed parisons or blanks, and a second control loop which detects the formed blanks, senses when the blanks deviate beyond the limits of a desirable range of length therefor and the direction of such deviation, and adjusts said preset in accordance with such sensing to bring the length of the blanks back within the limits of said range.

Other objects and characteristic features of the invention will become apparent as the description proceeds.

The invention will best be understood with reference to the single drawing figure which comprises a schematic view, partially in block diagram form, of the control system in accordance with and embodying the invention.

Referring to the drawing in detail there is shown, partially in cross section, a length of glass ribbon 79 which is being carried along by a conveyor 150 having an orifice therein through which the ribbon has been formed, partly by pressurized air supplied against the top surface of the ribbon by a blowhead 227, into a parison or blank P, such air being supplied to such blowhead from a blowbox, or puff-air manifold or supply chamber 201. Such apparatus per se, forms no part of the present invention but corresponds to apparatus shown in FIGS. 14, 19 and 20, or FIGS. 42, 43 and 46 of the aforesaid patent to Woods and Gray, the reference characters 79, 150, 201 and 227 of the present application corresponding to the respectively similar reference characters appearing in said figures of said patent.

Referring further to the drawing figure of the present case, there is shown a pneumatic motor valve 3 which controls the pressure and supply of pressurized air through a conduit or pipe 17 to blowbox, or puff-air manifold or supply chamber 201. Motor valve 3 is connected by a conduit or pipe 8 to a source of compressed or pressurized air which, for purposes of simplification of the drawing, is not shown therein. Motor valve 3 is also connected by a conduit 9 to an electropneumatic transducer 4 which produces pneumatic signals proportionate to electrical signals supplied thereto, such electrical signals being supplied across input terminals 36 and 37 of the transducer. Transducer 4 is also connected to the previously mentioned conduit or pipe 8 and thence to the above-mentioned source of pressurized or compressed air.

The components 3 and 4 are standard commercially available products well known to those skilled in the art. Pneumatic motor valve 3 may, for example, be of Type F22 Stabilflow control valve sold by The Foxboro Company, Foxboro, Massachusetts and described in Bulletin 5C-10 published by such company. The transducer 4 may, for example, be an electropneumatic transducer of the type sold by Moore Products Company, Spring House, Pennsylvania, and covered by Bulletin 7701 published by such company.

A differential pressure transmitter 6 is provided and has one of its pressure connections connected through a conduit or pipe 7 to atmosphere, that is to say, atmospheric pressure only is supplied through pipe 7 to such pressure connection of the transmitter. The other pressure connection of transmitter 6 is connected through a conduit or pipe 16 to the pressurized air in blowbox or puff-air manifold 201. Transmitter 6 produces a direct current electrical output signal proportionate to the differential pressure in the transmitter, that is, proportionate to the difference in the two pressures supplied to said pressure connections of the transmitter. Such electrical signal is supplied from output terminals 21 and 22 on the transmitter over electrical conductors 18 and 19, respectively, and thence across input terminals 23 and 24 of an electronic controller or receiver 5 described below.

Electronic controller or receiver 5 is of the type which produces an electrical output signal proportionate to any difference in an electrical measured signal supplied thereto and a direct current electrical set-point signal at which the controller is preset. In the present invention the measured signal is the electrical signal supplied from transmitter 6 over conductors 18 and 19, and across input terminals 23 and 24 of controller 5, as described above. The output signal from controller 5 is supplied to output terminals 31 and 32 on the controller, thence to electrical conductors 33 and 34, and across the previously mentioned input terminals 36 and 37 of electropneumatic transducer 4. Controller 5 is provided with a second pair of input terminals 26 and 27 across which said preset signal is supplied. This will be further discussed hereinafter in this description.

The components 5 and 6 are also standard commercially available products well known in the art. Receiver or electronic controller 5 may, for example, be the Model 62 Universal Controller sold by the aforesaid Foxboro Company and described in a technical information publication TI39-51a published by such company. Transmitter 6 may, for example, be the Type 613 Differential Pressure Transmitter also sold by The Foxboro Company and described in a technical information publication TI39-15a published by such company.

Referring further to the drawing in the case, parison or blank P may, as previously mentioned, be subsequently formed into an envelope or enclosure for an incandescent electric lamp and, as such, the thickness of the walls of the parison are greatly exaggerated but, it will be understood that such exaggeration is only for the purpose of ease of illustration thereof. It will be assumed, for the purpose of the remainder of this description, that parison or blank P shown in the drawing has just passed the point at which the supply of puff air thereto is terminated. The location of such puff air termination point is not necessary to an understanding of the present invention but, for informational purposes, it is pointed out that such point is just beyond the end of puff cam 244 illustrated in FIG. 19 of the aforesaid Woods et al patent. It is further pointed out that, although the present invention is described as sensing the lengths of the parisons when they are adjacent said puff air termination point, the lengths of the parisons could be sensed at another selected point in the path of travel of the parisons or blanks toward the puff air termination point.

Three radiant energy responsive or detection devices 10, 11 and 12, such as photo-responsive devices or photocells, for example, are shown vertically stacked in a contiguous relationship in the order stated, with device 10 being the uppermost of the three devices. Such stack of detection devices forms a detector which is supported, in any convenient manner, in such a position that it will respond to the luminosity of each hot parison or blank, such as P, as a succession of such blanks or parisons of sufficient length move past the detecting ends of the detector or stack of detection devices. It will be understood that the distance of the stack of detection devices from the bottom surface of conveyor 150 is determined by the desired or preselected length for the parisons, such as P, during any period of production of glass articles. As illustrated in the drawing by the dotted arrows, when a parison or blank, such as P, having a length within upper and lower limits of an allowable range in length passes through the detection path of the detection devices, devices 10 and 11 detect the luminosity of the hot parison, while device 12 does not. When a parison passes the detection devices but is of insufficient length, device 10 detects the presence of the passing parison, while device 11 and, of course, device 12 do not. When a parison having too great a length passes through the detection path of the detector, all three detection devices 10, 11 and 12 detect the passage of the parison. Such actuation of the detection devices 10, 11 and 12 will be discussed further hereinafter in this description.

Radiant energy responsive or detection devices, such as 10, 11 and 12, are old and well known, and are commercially available components. Such devices may, for example, be photocells similar to the diffused silicon PNPN photocells sold by Solid State Products Inc., 1 Pingree Street, Salem, Mass., under the name Photran and described in a publication published by such company. However, other types of radiant energy responsive devices could be employed for the detection devices 10, 11 and 12.

The radiant energy responsive devices or photocells 10, 11 and 12 are each connected to terminal X of a source of direct current of proper voltage and capacity, and respectively over electrical conductors 58, 57 and 56 to one end of the control windings of relays 54, 53 and 49, respectively. The other ends of the control windings of such relays are connected to terminal Y of the current source. Said current source is not shown in the drawing, for purpose of simplification thereof.

As mentioned above, one end of the control winding of relay 54 is connected over electrical conductor 58 to photocell 10 and, as will be readily recognized by those skilled in the art, relay 54 is energized and becomes picked-up to close its contact 73–74 whenever photocell 10 is triggered "on" by the detection thereby of a passing blank or parison such as P. In other words, when a succession of blanks of sufficient length are passing through the detection path of photocell 10, contact 73–74 closes as photocell 10 detects each passing blank or parison, and opens again, as indicated by the dotted position of the movable part of contact 73–74, during the time period between the passage of each blank, and the immediately succeeding blank, through the detection path of photocell 10. This will be readily apparent to those skilled in the art.

Relay 53 which, as previously mentioned, has one end of its control winding connected over electrical conductor 57 to photocell 11, is provided with a slow-release feature which includes an adjustable resistor 51, contact 81–82 of the relay, and a capacitor 52. That is to say, when the control winding of relay 53 becomes deenergized, it is slow to release or open its contacts such as 81–82. For a further understanding of the operation of relay 53, it will be assumed that the control winding of the relay is deenergized, and contacts 81–82 and 80–82 are open and closed, respectively. A passing parison such as P, triggers photocell 11 to its conducting or "on" condition and relay 53 immediately becomes picked-up (energized) and closes its contact 81–82. The opening of contact 80–82, at such time, interrupts a charging circuit for capacitor 52, such circuit extending from terminal X of the current source over said contact 80–82 of relay 53 and thence to one side of capacitor 52. The other side of capacitor 52 is connected to terminal Y of the direct current source and the second end of the control winding of relay 53. After the passage of parison P through the detection path of photocell 11, such photocell again becomes non-conducting and interrupts the supply of electrical energy to conductor 57. At such time capacitor 52 begins to discharge through resistor 51 and the control winding of relay 53 and, thus, such relay is maintained in its picked-up (energized) condition for a period of time depending on the discharge rate of capacitor 52 as adjusted by the setting of resistor 51. It is required that relay 53 will remain picked-up during the period between the passage of each blank and the immediately succeeding blank of a succession of blanks or parisons of a proper length. Also the passage past the detectors of a selected number of successive blanks which are too short in length may be considered to be only a transient condition and, therefore, it may be desired that relay 53 remain picked-up during such period. For example, it will be assumed that the passage through the detection path of two successive blanks which are too short in length is considered to be merely a transient condition. It is, therefore, desired that relay 53 will remain picked-up during the period of passage of such two blanks but will release if the third successive blank following one of proper length is also of insufficient length. Resistor 51 is, therefore, adjusted to control the discharge period of capacitor 52 so that relay 53 will remain picked-up for the period of time between the passage of four successive blanks, even though energy to conductor 57 from photocell 11 is interrupted for such period of time. The duration of such time period will depend, of course, on the speed of the passage of the blanks past the detectors.

Relay 49 which, as previously mentioned, has one end of its control winding connected to conductor 56 and thence to photocell 12, is provided with a slow-release feature which includes an adjustable resistor, contact 83–85 of the relay and capacitor 48. That is, when photocell 12 is triggered to its conducting or "on" condition by the detection of a parison or blank such as P, relay 49 becomes picked-up immediately. However, upon the passing of such parison or blank the energy to conductor 56 is terminated but relay 49 does not immediately release since capacitor 48, at such time, discharges through the control winding of the relay. A charging circuit for capacitor 48 extends from terminal X of the direct current source over contact 84–85 of relay 49 and thence to one side of capacitor 48, the other side of such capacitor being connected to terminal Y of said current source and also to the second end of the control winding of relay 49. The discharge circuit for capacitor 48 extends from said one side of the capacitor, over contact 83–85 of relay 49, resistor 47, the winding of relay 49 and thence through such winding to the other side of capacitor 48. It is readily apparent that the slow-release feature provided for relay 49 is similar to that provided for relay 53. However, resistor 47 is adjusted so that the discharge of capacitor 48, following the interruption of the energy to conductor 56, maintains relay 49 in its picked-up (energized) condition for a time period sufficient only to bridge the gap between the passing of two successive parisons or blanks of excessive length. It is, therefore, apparent that when photocell 12 detects a passing parison or blank of excessive length, relay 49 becomes picked-up but does not remain in such condition unless two or more successive blanks of excessive length are detected by photocell 12. It is also believed apparent that said adjustment of resistor 47 depends on the rate of speed of the passage of the blanks or parisons past the photocell.

A fourth relay 86 is employed and is provided with a pick-up (energizing) circuit which extends from terminal X of said current source over contact 67–68 of relay 49 and thence through the winding of relay 86 to terminal Y of the current source. Relay 86 is provided with a slow-release feature including a capacitor 88, contact 89–90 of the relay and an adjustable resistor 87. As long as relay 49 is released (deenergized) relay 86 is maintained picked-up (energized) over its above traced pick-up circuit. At such time, capacitor 88 also becomes charged over a circuit which may be traced from terminal X of said current source, contact 67–68 of relay 49, resistor 87, contact 89–90 of relay 86 and thence to one side of capacitor 88, the other side of capacitor 88 being connected to terminal Y of the current source and the second end of the control winding of relay 86. When the pick-up circuit for relay 86 is interrupted by relay 49 becoming picked up (energized) and opening its contact 67–68, relay 86 is temporarily maintained in its picked-up condition by the discharge of capacitor 88 through the winding of the relay, such discharge path extending from said one side of the capacitor over contact 89–90 of relay 86, resistor 87, and through the winding of relay 86 to the other side of capacitor 88.

Relay 86 and its slow release feature operate similarly to relay 53. That is to say, such relay is provided to assure that the detection of the passage of one or more successive blanks or parisons of excessive length is more than a transient condition. Assuming, for example, that relay 49 detects the passage of a first parison of excessive length, relay 49 immediately becomes picked-up (energized) and opens its contact 67–68, thus opening the pickup circuit for relay 86. Relay 86 does not immediately release, however, due to its slow-release feature. If the blank or parison next succeeding said first parison is not of excessive length, relay 49 releases and recloses the pickup circuit for relay 86. Assuming that the passage of only two succeeding blanks or parisons of excessive length is considered to be merely a transient condition, resistor 87 is adjusted so that relay 86 will remain picked-up for the period required for the passage of such two blanks and the arrival of the blank next succeding said two at the detection position. If such next succeeding blank is also of excessive length, relay 49 remains energized and relay 86 is released. If, however, said next succeeding blank is not of excessive length, relay 49 releases and again closes the pickup circuit for relay 86 and such relay is, thereby, maintained in its picked-up condition. The adjustment of resistor 87, similarly to the adjustment of resistors 51 and 47, depends on the rate of speed of passage of the parisons or blanks, such as P, past the photocells. The circuits controlled by relays 54, 53 and 86 will be discussed hereinafter in this description.

An electromagnetic impulse actuated stepping motor 39 is provided, such motor having a rotor 41 whose shaft is connected through a suitable gearing arrangement 38 to the wiper arm 45 of a potentiometer 46. The shaft connection of rotor 41 through said gearing arrangement and to said wiper arm is indicated in the conventional manner by a dotted line extending between such apparatus. For purposes of simplicity, only the pole pieces and associated windings of motor 39 will be discussed in any detail.

Motor 39 is provided with input terminals 61, 62 and 63, rotor 41, and two pole pieces 42 and 43 having windings 42a and 43a, respectively. The ends of winding 42a are connected to terminals 61 and 63 of the motor, and the ends of winding 43a are connected to terminals 62 and 63 of the motor. Terminal 63 of the motor is connected to terminal Y of the direct current source. When a pulse of energy from terminal X of the direct current source is supplied, as hereinafter described, to terminal 61 of the motor, the motor rotor 41 is actuated a partial revolution in a first direction, and when a pulse of energy from terminal X of the current source is supplied, as hereinafter described, to terminal 62 of the motor, rotor 41 is actuated a partial revolution in the direction opposite to said first direction. Such pulse actuated motors are well known. For example, an electromagnetic motor of the type disclosed in Letters Patent of the United States 2,432,600, issued Dec. 16, 1947 to Sture Edward Werner et al. for Electromagnetic Motor may be used for motor 39. It is to be understood, however, that the invention is not to be confined to the use of such a motor but any suitable bi-directional electrical impulse stepping device, such as a ratchet operated device etc., can be used for motor 39.

As previously mentioned, the rotor shaft of motor 39 is connected by suitable driving means through a suitable gearing arrangement 38 to the wiper arm 45 of potentiometer 46, such wiper arm thereby being moved in one direction when the rotor 41 of the motor is actuated by an impulse supplied to winding 42a of the motor and in the opposite direction when the rotor is actuated by an impulse supplied to winding 43a of the motor.

Winding 42a of motor 39 is provided with an energizing circuit which extends from terminal X of the direct current source, contact 73-74 of relay 54, conductor 76, contact 71-72 of relay 53, and thence over conductor 64 to terminal 61 of the motor, and through winding 42a of the motor to terminal 63 of the motor and terminal Y of the direct current source. Winding 43a of motor 39 is provided with an energizing circuit which may be traced from terminal X of the current source, over said contact 73-74 of relay 54, conductor 76, contact 92-93 of relay 86, conductor 66, terminal 62 of the motor, and thence through winding 43a of the motor to terminal 63 of the motor and terminal Y of the current source. It is thus apparent that, when relay 53 is released (deenergized) a pulse of energy is supplied to winding 42a of motor 39 with each actuation of photocell 10 to its "on" or conducting condition and the resultant momentary energization of relay 54. Similarly, when relay 86 is released (deenergized) a pulse of energy is supplied to winding 43a of motor 39 with each actuation of photocell 10 to its conducting condition and the resultant momentary energization of relay 54.

The winding of potentiometer 46 is connected across terminals X and Y of the direct current source, and the wiper arm 45 of the potentiometer is connected over a conductor 28 to the previously mentioned input terminal 26 of electronic controller or receiver 5. The previously mentioned input terminal 27 of receiver 5 is connected to terminal Y of the direct current source. It is thus apparent that the previously mentioned set point signal is supplied from said direct current source through the winding and wiper arm 45 of potentiometer 46, and across the input terminals 26 and 27 of electronic controller or receiver 5.

A brief operational example of the invention will now be given.

For the purpose of the operational example it will be assumed that, for the forming of blanks or parisons, such as P, of proper length, it has been initially determined that a pressure of 15 p.s.i. above atmospheric pressure should be maintained within blowbox, or puff-air manifold or supply chamber 201. Such determination may be made empirically or by experimentation, for example. The wiper arm 45 of potentiometer 46 is initially set at approximately the mid-point of the winding of the potentiometer and a preset signal is thus supplied across terminals 26 and 27 of controller 5. Differential pressure transmitter 6 is adjusted so that it produces an output signal equal to said set-point or preset signal when the pressure within manifold 201 is 15 p.s.i above atmospheric pressure. The output signal from transmitter 6 increases or decreases in value according as the pressure in manifold 201 increases or decreases, respectively.

It will be noted that when the set-point signal is first supplied across input terminals 26 and 27 of receiver 5, no measured signal is being supplied across input terminals 23 and 24 of the receiver since there is, at such time, no pressurized air in manifold 201. The set-point signal supplied across terminals 26 and 27 of controller 5, is compared to the zero measured signal supplied, at such time, across terminals 23 and 24 of the controller, and controller 5 produces at its output terminals 31 and 32 a signal proportionate to the difference in said signals. This differential signal is supplied from output terminals 31 and 32 of controller 5 across the input terminals 36 and 37 of electropneumatic transducer 4.

The electrical signal supplied across said input terminals 36 and 37 of transducer 4 actuates such transducer to produce a pneumatic output signal proportionate to such electrical signal. This pneumatic signal is supplied over conduit 9 to motor valve 3 which responds to such pneumatic signal to supply pressurized air over conduit 17 to manifold 201. As the pressure within manifold 201 increases, the pressure supplied over conduit 16 to differential pressure transmitter 6 also increases. As the pressure differential in transmitter 6 increases, the electrical signal output from transmitter 6 correspondingly increases and is supplied across measured signal input terminals 23 and 24 of controller 5, thus reducing the differential between the set-point signal and such measured signal supplied to controller 5, and proportionately adjusting the output signal from such controller. Such cyclic operation of components 3, 4, 5 and 6 is at a relatively rapid rate of speed and continues until the differential pressure within transmitter 6 is 15 p.s.i. and, therefore, the signal supplied from such transmitter to controller 5 equals the set-point signal supplied over potentiometer 46 to such controller. At such time motor valve 3, in response to the pneumatic signal from transducer 4, controls and thereafter maintains the pressure within manifold 201 at 15 p.s.i. above atmospheric pressure.

It is pointed out that, if the pressurized air supplied to manifold 201 should, for some reason or other, increase in pressure above 15 p.s.i., differential pressure transmitter 6 detects such change in pressure and adjusts the measured signal supplied to controller 5, in a first direction, in accordance with such change. Such adjustment in the measured signal causes controller 5 to produce an output signal proportionate to the value and direction of such adjustment in the measured signal. This output signal is supplied to transducer 4 which in turn proportionately adjusts the pneumatic signal supplied to motor valve 3. Motor valve 3 in turn proportionally reduces the supply of pressurized air to manifold 201 to reduce the pressure therein and bring it back to the 15 p.s.i. differential pressure, for which transmitter 6 is adjusted. Similarly, should leakage or an increase in the use of air from manifold 201 cause a drop in pressure therein below 15 p.s.i., differential pressure transmitter 6 detects such drop in pressure and adjusts the measured signal supplied to controller 5 in the direction opposite to said first direction. Such adjusted measured signal causes controller 5 to produce an output signal proportionate to the value of and having a direction corresponding to the direction of adjustment of the measured signal, such direction being opposite to that produced by controller 5 when the pressure in manifold 201 increased. The output signal from controller 5 is again supplied to transducer 4 which in turn proportionately adjusts the pneumatic signal supplied to motor valve 3. Motor valve 3 in turn proportionately increases the supply of pressurized air to manifold 201 to increase the pressure therein and again bring it back to the 15 p.s.i. pressure for which transmitter 6 is adjusted. It is thus apparent that a first loop is provided which maintains the pressure in puff-air manifold or blowbox 201 at an initial preselected pressure.

Having thus described the operation of the first control loop of the invention, an operational description of the second control loop will be given.

When parisons or blanks, such as P, of proper length are passing through the detection path of photocells 10, 11 and 12, photocell 10 detects each passing blank and relay 54 is operated to close its contact 73-74 with the passage of each parison or blank, such contact opening during the gaps between the passage of each succeeding blank. Photocell 11 also detects each passing blank and relay 53 is energized, over its pickup circuit, during the passage of each such blank and is maintained picked-up (energized), during the gaps between the passage of each succeeding blank, by its slow-release feature previously discussed. At such time, relays 49 and 86 remain released (deenergized) and picked-up (energized) respectively, since photocell 12 does not detect the passage of blanks of proper length. It is also pointed out that, at such time, the energizing circuits to the windings 42a and 43a of motor 39 are maintained open at contact 71–72 of relay 53 and contact 92–93 of relay 86, respectively.

Assuming that a group of less than three successive blanks which are too long or too short in length are considered to be merely the result of a brief transient condition, resistors 51 and 87 are, as previously described, adjusted so that relays 53 and 86 will remain picked-up for the duration of the period required for the passage of such a number of blanks. No operation of motor 39 takes place at such time. Assuming now that a group of three or more sucessive blanks which are too short in length pass through the detection path of photocell 10 only, relay 53 becomes released (deenergized) upon the termination of the discharge of capacitor 52 through the control winding of relay 53, and contact 71–72 of such relay closes upon the passage of the third of said blanks. Relay 54 becomes picked-up and released by the passage of each blank and closes and opens its contact 73–74 upon each such passage. When contact 71–72 of relay 53 closes, upon the passage of the third blank which is too short in length, a pulsing circuit to winding 42a of motor 39 is completed, such circuit including said contact 73–74 of relay 54 and contact 71–72 of relay 53. A pulse of energy is thereafter supplied to winding 42a of motor 39 upon the passage of each blank which is too short in length.

The pulses of energy supplied to winding 42a of motor 39 step rotor 41 of the motor in a first direction and the shaft of such rotor, by means of its connection through gearing 38 to the wiper arm 45 of potentiometer 46, drives such wiper arm to adjust the set-point signal, being supplied from the potentiometer across the input terminals 26 and 27 of controller 5, in a first direction. At such time, the wiper arm 45 of potentiometer 46 may, for example, be moved toward the end of the winding of the potentiometer which is connected to terminal X of the current source. Such movement of wiper arm 45 adjusts the set-point signal in a positive-going direction, that is, such movement increases the value of the set-point signal.

As the set-point signal supplied to controller 5 is adjusted, such controller produces an output signal proportionate to the difference between such signal and the measured signal supplied across terminals 23 and 24 of the controller, that is, proportionate to the direction and value of the change in the set-point signal. The output signal from controller 5 is supplied to transducer 4 which corresopndingly adjusts the pneumatic signal supplied to motor valve 3. Motor valve 3 in turn correspondingly adjusts (increases) the pressure in puff-air manifold 201 so that puff air of a higher pressure will be supplied to the blanks or parisons to increase the length thereof to the proper length. The increase in pressure in manifold 201 is also supplied to transmitter 6 which increases the measured signal supplied to receiver or controller 5. When a blank of proper length is again detected by photocell 11, relay 53 immediately becomes energized and opens the impulse circuit to winding 42a of motor 39. The wiper arm of potentiometer 45 is no longer moved but remains at the last point of adjustment thereof. The increased set-point signal is continued to be supplied to controller 5 and such component, along with components 3, 4 and 6, operate to maintain the pressure in manifold 201 at an increased pressure which is proportionate to the new set-point signal being supplied to controller 5. It is pointed out that such increased pressure in manifold 201 also correspondingly causes adjustment of the measured differential pressure signal from transmitter 6 so that such signal equals the new increased set-point signal.

It will now be assumed that a group of three or more successive blanks which are too long in length pass through the detection path of photocells 10, 11 and 12. Upon the passage of the first of such blanks, relay 49 becomes picked-up (energized) and remains in such condition until the passage of said group of blanks terminates. The energization or picking-up of relay 49 opens the pickup circuit for relay 86 and, upon the passage of the third blank of said group of blanks, relay 86 becomes released (deenergized) the discharge of capacitor 88 through the control winding of relay 86 terminating at such time. The release of relay 86 closes the pulsing circuit to winding 43a of motor 39, such circuit extending from terminal X of the direct current source, contact 73–74 of relay 54, conductor 76, contact 92–93 of relay 86, conductor 66, terminal 62 of motor 39, and thence through winding 43a of motor 39, and to terminal 63 of the motor and terminal Y of the direct current source.

The pulses of energy supplied to winding 43a of motor 39 step rotor 41 of the motor in a second direction, opposite to the previously mentioned first direction of the stepping thereof, and the shaft of such motor, by means of its said connection to wiper arm 45 of potentiometer 46, drives such wiper arm to adjust the set-point signal, being supplied from the potentiometer across the input terminals 26 and 27 of controller 5, in a second direction opposite to the previously described first direction of such adjustment. At such time, the wiper arm 45 of potentiometer 46 will, for example, be moved toward the end of the winding of the potentiometer which is connected to terminal Y of the current source. Such movement of wiper arm 45 adjusts the set-point signal in a negative-going direction, that is, such movement decreases the value of the set-point signal.

As the set-point signal supplied to controller 5 is adjusted, such controller produces an output signal proportionate to the difference between such signal and the measured signal supplied across terminals 23 and 24 of the controller, that is, proportionate to the direction and value of the change in the set-point signal. The output signal from controller 5 is supplied to transducer 4 which correspondingly adjusts the pneumatic signal supplied to motor valve 3. Motor valve 3 in turn correspondingly adjusts (decreases) the pressure in puff-air manifold 201 so that puff air of a lower pressure will be supplied to the blanks or parisons to decrease the length thereof to the proper length. The decrease in pressure in manifold 201 causes a corresponding adjustment in transmitter 6 which decreases the measured signal supplied to receiver 5. When a blank of proper length again passes through the path of detection of the photocells, relays 49 and 86 again become released and picked up, respectively. The picking up of relay 86 opens the impulse circuit to winding 43a of motor 39, and the wiper arm of potentiometer 46 is no longer moved but remains at the last point of adjustment thereof. The decreased set-point signal is continued to be supplied to controller 5 and, such component, along with components 3, 4 and 6, operate to maintain the pressure in manifold 201 at a decreased pressure which is proportionate to the new set-point signal being supplied to controller 5. It is pointed out that such decreased pressure in manifold 201 also correspondingly causes adjustment of the measured differential signal from transmitter 6 so that such signal equals the new decreased set-point signal.

It should be pointed out that relay 54 need not necessarily be provided, but that the impulses to motor 39 could be supplied directly from photocell 10 over conductor 58 to conductor 76 and thence to the control windings of motor 39. It is also pointed out that relays with slow-release features, such relays 53, 49 and 86 need not necessarily be employed, but timing devices well known in the art, such as time-delay relays, could be employed in place of the relays and their slow-release features illustrated. Furthermore, counting devices which count the passage of each successive blank which are too long or too short in length could be employed for delaying the supply of impulses to the windings of motor 39 until a predetermined number of such successive blanks pass the photocells.

It is also pointed out that other signal adjusting means rather than a potentiometer could be employed for directionally adjusting the value of the set-point signal supplied to controller 5. All such modifications are believed to be well within the scope of the present invention.

Although there is herein shown and described only one form of apparatus embodying the invention, it is to be understood that various changes and modifications may be made therein within the scope of the appended claims without departing from the spirit and scope of the invention.

What is claimed is:

1. In combination with an apparatus for forming a succession of pendent hollow bodies of a thermoplastic material partly by supplying pressurized aeriform fluid thereto from a supply of such fluid, apparatus for controlling the pressure of said fluid supplied to each of said succession of hollow bodies so as to maintain the length of the majority thereof within the limits of a preselected range of length therefor, such apparatus comprising, a detector comprising at least three vertically stacked radiant energy responsive devices (10, 11, 12) such detector being mounted so as to detect each successive body of said succession of bodies when such body is at least of a predetermined length, a motor valve (3) for regulating the pressure of said supply of fluid, pressure responsive means (6) for producing a first signal varying in value proportionately to changes in the pressure of said supply, adjustable second signal producing means (45, 46) for producing a set-point signal varying in value proportionately to the adjustment of such adjustable means, comparison means (5) for comparing said first and second signals and producing a third signal varying in value and direction proportionately to changes in value of said first and second signals, motor valve actuating means (4) responsive to said third signal for actuating said motor valve to regulate the pressure of said supply of fluid to maintain the value of said first signal proportionate to the value of said second signal, and detector controlled means (38, 39) selectively actuated by said detector and for adjusting said set-point signal producing means to respectively increase and decrease the pressure of said supply of fluid when and accordingly as at least a predetermined number of succeeding ones of said bodies are without the lower and upper limits, respectively, of said preselected range of length.

2. Apparatus in accordance with claim 1 in which said radiant energy responsive devices are photocells and said bodies are hot glass parisons.

3. In combination with apparatus by which a succession of pendent hollow bodies are formed from a viscous thermoplastic material partly by pressurized fluid supplied thereto from a fluid supply chamber as such succession of bodies move through a predetermined path of travel, apparatus for regulating the pressure of said fluid in said supply chamber when a number of successive ones of said bodies, greater than a first and a second predetermined number thereof, are without upper and lower limits, respectively, of a preselected range of length therefor, said apparatus comprising; three radiant energy detection devices (10, 11, 12) arranged one above the other and having their detection paths aligned transverse said path of travel, the detection path of the uppermost of said devices being aligned so as to detect each of said bodies having greater than a preselected minimum length, and the detection paths of the middle and lowermost of said devices being aligned so that the upper margins of such detection paths of the middle and lowermost devices define said lower and upper limits, respectively, of said preselected range of length; adjustable first signal producing means (45, 46) for producing an adjustable direct current set-point signal of a first polarity, such signal having an initial value representative of a selected initial pressure for said fluid in said supply chamber and adjustable in value in accordance with changes required in said pressure to bring the length of said bodies within said preselected range of length therefor; second signal producing means (6) for producing a direct current signal of a second polarity and varying in value proportionately to changes in pressure of said fluid in said supply chamber, third signal producing means (5) for algebraically summing said first and second signals and producing a third signal varying in value accordingly as such summation varies, pressure regulating means (3) responsive to said third signal for regulating the pressure of said fluid in said supply chamber proportionately to variations in value of such third signal; set-point signal adjusting means (38, 39, 53, 54) controlled by said uppermost and middle detection devices for continuously adjusting said set-point signal producing means to continuously adjust the value of the set-point signal in a first direction when and so long as a number of successive ones of said bodies, greater than said first predetermined number thereof, is outside the lower limit of said preselected range of length for such bodies; and set-point signal adjusting means (38, 39, 49, 54, 86) controlled by said uppermost and lowermost detection devices for continuously adjusting said set-point signal producing means to continuously adjust the value of the set-point signal in a second direction when and so long as a number of successive ones of said bodies, greater than said second predetermined number thereof, is outside the upper limit of said preselected range of length for such bodies.

4. Apparatus in accordance with claim 3 in which said set-point signal producing means comprises an adjustable resistance.

5. Apparatus in accordance with claim 3 in which said bodies are hot parisons formed from a glass-making material and said detection devices are photocells.

6. Apparatus in accordance with claim 3 in which said means for adjusting said set-point signal producing means includes a plurality of timing devices.

7. Apparatus in accordance with claim 6 in which the timing periods of said timing devices are adjusted in accordance with the rate of speed of passage of said bodies past said detectors.

8. Apparatus in accordance with claim 6 in which said timing devices are relays provided with features to make the relays slow-acting.

9. Apparatus in accordance with claim 8 in which said slow-acting features are adjusted in accordance with the rate of speed of passage of said bodies past said detectors.

References Cited

UNITED STATES PATENTS

| 2,150,017 | 3/1939 | Barnard | 65—161 XR |
| 2,184,900 | 12/1939 | Snyder | 65—300 |
| 2,954,644 | 10/1960 | Montgomery | 65—162 XR |
| 2,958,160 | 11/1960 | Cooke et al. | 65—163 XR |
| 3,035,371 | 5/1962 | Mouly et al. | 65—161 |

DONALL H. SYLVESTER, *Primary Examiner.*

F. W. MIGA, *Assistant Examiner.*